(12) United States Patent
Wang

(10) Patent No.: US 8,965,190 B2
(45) Date of Patent: Feb. 24, 2015

(54) OPTICAL IMAGE STABILIZER AND IMAGE CAPTURING DEVICE

(75) Inventor: Ya-Ling Wang, Taichung (TW)

(73) Assignee: Asia Optical International Ltd., Tortola (VG)

( * ) Notice: Subject to any disclaimer, the term of this patent is extended or adjusted under 35 U.S.C. 154(b) by 30 days.

(21) Appl. No.: 13/452,928

(22) Filed: Apr. 22, 2012

(65) Prior Publication Data
US 2013/0156411 A1    Jun. 20, 2013

(30) Foreign Application Priority Data
Dec. 15, 2011 (TW) .............................. 100146533 A

(51) Int. Cl.
*G03B 17/00* (2006.01)
(52) U.S. Cl.
USPC ......................................................... 396/55
(58) Field of Classification Search
USPC ............ 396/52, 55; 348/208.99, 208.1, 208.2
See application file for complete search history.

(56) References Cited

U.S. PATENT DOCUMENTS

| | | | |
|---|---|---|---|
| 5,117,246 A * | 5/1992 | Takahashi et al. ............... | 396/55 |
| 5,243,462 A * | 9/1993 | Kobayashi et al. ............ | 359/557 |
| 5,266,981 A * | 11/1993 | Hamada et al. .................. | 396/55 |
| 8,442,393 B2 * | 5/2013 | Bang et al. ....................... | 396/55 |
| 2006/0269261 A1 | 11/2006 | Wernersson | |
| 2009/0128637 A1 * | 5/2009 | Noji ............................ | 348/208.1 |
| 2009/0225176 A1 * | 9/2009 | Honjo ....................... | 348/208.99 |
| 2010/0124411 A1 | 5/2010 | Hirayama | |
| 2011/0103781 A1 * | 5/2011 | Bang et al. ....................... | 396/55 |
| 2012/0222503 A1 * | 9/2012 | Huang et al. ....................... | 74/25 |
| 2012/0251088 A1 * | 10/2012 | Huang et al. .................... | 396/52 |
| 2013/0121672 A1 * | 5/2013 | Shikama et al. ................. | 396/55 |

FOREIGN PATENT DOCUMENTS

| | | |
|---|---|---|
| TW | 200736812 | 10/2007 |
| TW | 201142171 | 12/2011 |

OTHER PUBLICATIONS

"Office Action of Taiwan counterpart application" issued on Dec. 12, 2013, p. 1-p. 6, in which the listed references were cited.

* cited by examiner

*Primary Examiner* — Clayton E Laballe
*Assistant Examiner* — Warren K Fenwick
(74) *Attorney, Agent, or Firm* — Jianq Chyun IP Office

(57) ABSTRACT

An optical image stabilizer includes a magnetic element, a moving platform, at least one first sensor and at least one second sensor. The magnetic element is fixed on a main body. The moving platform is movably disposed on the main body. The first and the second sensors are fixed on the moving platform. When the moving platform moves relatively to the main body, the first sensor senses a variation of a magnetic force applied to the first sensor by the magnetic element for calculating a displacement of the moving platform along a first direction, and the second sensor senses a variation of a magnetic force applied to the second sensor by the magnetic element for calculating a displacement of the moving platform along a second direction. The first direction is perpendicular to the second direction. In addition, an image capturing device having the optical image stabilizer is also provided.

10 Claims, 4 Drawing Sheets

OPTICAL IMAGE STABILIZER AND IMAGE CAPTURING DEVICE

CROSS-REFERENCE TO RELATED APPLICATION

This application claims the priority benefit of Taiwan application serial no. 100146533, filed on Dec. 15, 2011. The entirety of the above-mentioned patent application is hereby incorporated by reference herein and made a part of this specification.

BACKGROUND OF THE INVENTION

1. Field of the Invention

The present invention relates to an image stabilizer and an image capturing device, and particularly relates to an optical image stabilizer and an image capturing device using the same.

2. Description of Related Art

Image capturing devices, such as digital video camera (DVC) and digital still camera (DSC) include various functions for users to capture images of objects. When users use small-sized portable device such as digital video camera or digital still camera to capture images of objects, the vibration of the camera would pose a negative impact on the images. For ensuring the stability of the images, various techniques for detecting and compensating the vibration of the cameras are adopted. According to different compensating methods, image stabilizers can be divided into three types: electronic image stabilizer (EIS), optical image stabilizer (OIS) and digital image stabilizer (DIS).

In general, an optical image stabilizer detects the vibration value of a camera by accelerometer, gyroscope, etc., and drives the moving platform generating a displacement in order to move the lens for compensating the vibration value of the camera. When the moving platform generates the displacement, a sensor is used to sense the displacement value of the moving platform and determine whether the displacement is enough to compensate the vibration value of the camera in order to decide either to continue or to stop driving the moving platform to move. In detail, a plurality of sensors are fixed on the moving platform, and a plurality of the magnetic elements corresponding to the sensors are disposed on the camera. When the moving platform moves, the variation of the magnetic force applied to the corresponding sensor by each magnetic element can be sensed for measuring the displacement value of the moving platform along a plurality of directions, for example, horizontal direction, vertical direction, etc. The disposition of the magnetic elements described above increases the manufacturing cost and takes up the inner space of cameras. If the layout of the magnetic elements can be simplified, the manufacturing cost and the layout space can be effectively decreased. Furthermore, the sensing range of the sensors is limited, therefore, how to effectively increase the sensing range thereof has become an important subject for the design of optical image stabilizers.

SUMMARY OF THE INVENTION

The present invention is directed to an optical image stabilizer which can save the manufacturing cost and the layout space.

The present invention is further directed to an image capturing device, wherein the optical image stabilizer thereof can save the manufacturing cost and the layout space.

The present invention provides an optical image stabilizer, adapted to be used in an image capturing device, comprising a magnetic element, a moving platform, at least a first sensor and at least a second sensor. The magnetic element is fixed on a main body of the image capturing device. The moving platform is movably disposed on the main body. A region of the moving platform is aligned to the magnetic element. The first sensor is fixed on the region. When the moving platform moves relatively to the main body, the first sensor senses the variation of the magnetic force applied to the first sensor by the magnetic element for calculating a displacement value of the moving platform along a first direction. The second sensor is fixed on the region. When the moving platform moves relatively to the main body, the second sensor senses the variation of the magnetic force applied to the second sensor by the magnetic element for calculating a displacement value of the moving platform along a second direction. The first direction is perpendicular to the second direction.

In an embodiment of the present invention, the two first sensors and the two second sensors surround an intersection of a first axis and a second axis.

The present invention provides an image capturing device comprising a main body and an optical image stabilizer. The optical image stabilizer includes a magnetic element, a moving platform, at least a first sensor and at least a second sensor. The magnetic element is fixed on the main body. The moving platform is movably disposed on the main body. A region of the moving platform is aligned to the magnetic element. The first sensor is fixed on the region. When the moving platform moves relatively to the main body, the first sensor senses the variation of the magnetic force applied to the first sensor by the magnetic element for calculating a displacement value of the moving platform along a first direction. The second sensor is fixed on the region. When the moving platform moves relatively to the main body, the second sensor senses the variation of the magnetic force applied to the second sensor by the magnetic element for calculating a displacement value of the moving platform along a second direction. The first direction is perpendicular to the second direction.

In an embodiment of the present invention, the image capturing device includes a control circuit and a vibration sensor. The control circuit is disposed on the main body and is electronically connected to the moving platform. The vibration sensor is disposed on the main body and is electronically connected to the control circuit. The vibration sensor is configured to sense a vibration value of the main body. The control circuit is configured to drive the moving platform to move relatively to the main body for compensating the vibration value.

In an embodiment of the present invention, the first sensor and the second sensor are electronically connected to the control circuit. When the displacement value of the moving platform along the first direction and the displacement value of the moving platform along the second direction are enough to compensate the vibration value, the control circuit stops driving the moving platform.

In an embodiment of the present invention, the number of the at least one first sensors is two and the first sensors are arranged along a first axis, the number of the at least one second sensors is two and the second sensors are arranged along a second axis, wherein the first axis is parallel to the first direction, the second axis is parallel to the second direction, the two first sensors are spaced by a distance, and the two second sensors are spaced by a distance.

In light of the foregoing descriptions, the first sensor and the second sensor of the present invention are disposed on the same region of the moving platform in order to sense the magnetic force generated by the same magnetic element. Therefore, the present invention only needs to be disposed one magnetic element for the first sensor and the second sensor to perform sensing process, and to calculate the displacement value of the moving platform along the first direction and the second direction for saving the manufacturing cost and the layout space.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
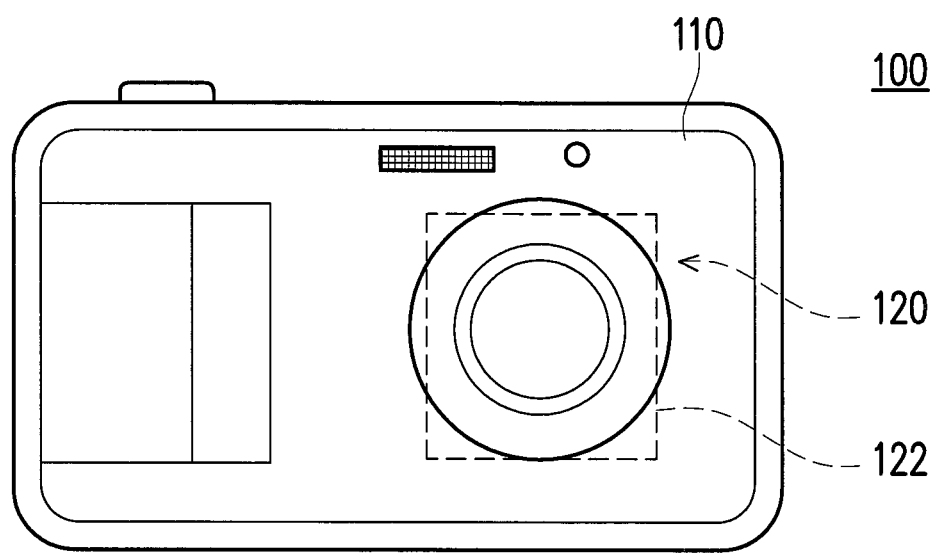
FIG. 1 is a front view of the image capturing device according to an embodiment of the present invention.

FIG. 1 is a front view of the image capturing device according to an embodiment of the present invention. Referring to FIG. 1, the image capturing device 100 of the present embodiment includes a main body 110 and an optical image stabilizer 120. The image capturing device 100 is, for example, a digital camera. The optical image stabilizer 120 is configured to compensate the vibration generated by users while operating the digital camera. In other embodiment, the image capturing device 100 can be other suitable types of devices, which is not limited in the present invention.

Figure 2:
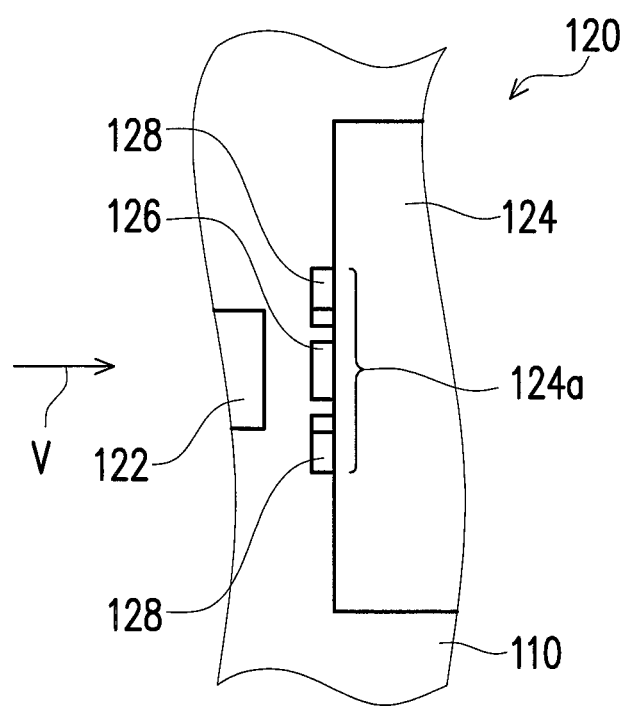
FIG. 2 is a partial view of the optical image stabilizer according to FIG. 1.
Figure 3:
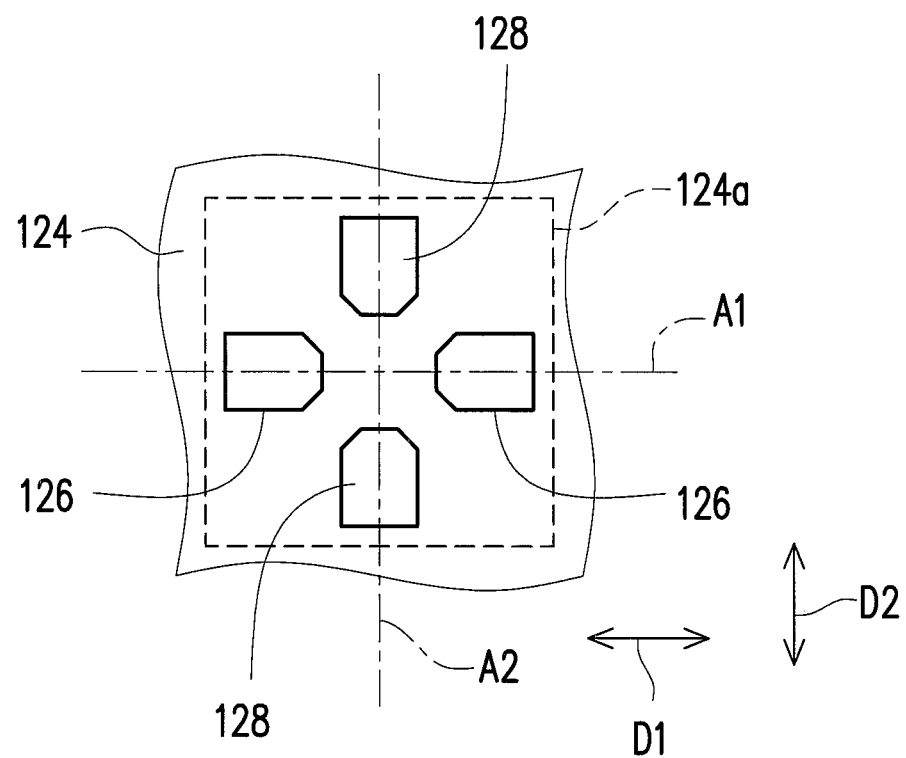
FIG. 3 is a schematic view of the optical image stabilizer along the viewing angle V according to FIG. 2.

FIG. 2 is a partial view of the optical image stabilizer according to FIG. 1. FIG. 3 is a schematic view of the optical image stabilizer along the viewing angle V according to FIG. 2. For clarity of the Figures, the magnetic element 122 of FIG. 2 is not shown in FIG. 3. Referring to FIG. 2 and FIG. 3, the optical image stabilizer 120 includes a magnetic element 122, a moving platform 124, at least a first sensor 126 and at least a second sensor 128. The magnetic element 122 is, for example, permanent magnet, and is fixed to the main body 110. The moving platform 124 is movably disposed on the main body 110 and a region 124a of the moving platform 124 is aligned to the magnetic element 122. The first sensor 126 and the second sensor 128 are fixed on the region 124a.

When the main body 110 of the image capturing device 100 generates a vibration, the moving platform 124 can move relatively to the main body 110 and adjust the position of optical elements such as lens to compensate the vibration. When the moving platform 124 moves relatively to the main body 110, the magnetic force applied to the first sensor 126 and the second sensor 128 by the magnetic element 122 changes. The first sensor 126 can sense the variation of the magnetic force applied to the first sensor 126 by the magnetic element 122 for calculating the displacement value of the moving platform 124 along a first direction D1. The second sensor 128 can sense the variation of the magnetic force applied to the second sensor 128 by the magnetic element 122 for calculating the displacement value of the moving platform 124 along a second direction D2 perpendicular to the first direction D1 to determine whether the displacement of the moving platform 124 is enough to compensate the vibration value of the image capturing device 100 to decide either to continue or to stop driving the moving platform 124 to move.

Under said arrangement, the first sensor 126 and the second sensor 128 are disposed on the same region 124a of the moving platform 124 for sensing the magnetic force generated by the same magnetic element 122. Therefore, the present invention only needs to be disposed one magnetic element 122 for the first sensor 126 and the second sensor 128 to perform sensing process, and to calculate the displacement value of the moving platform 124 along the first direction D1 and the second direction D2 in order to save the manufacturing cost and the layout space.

Figure 4:
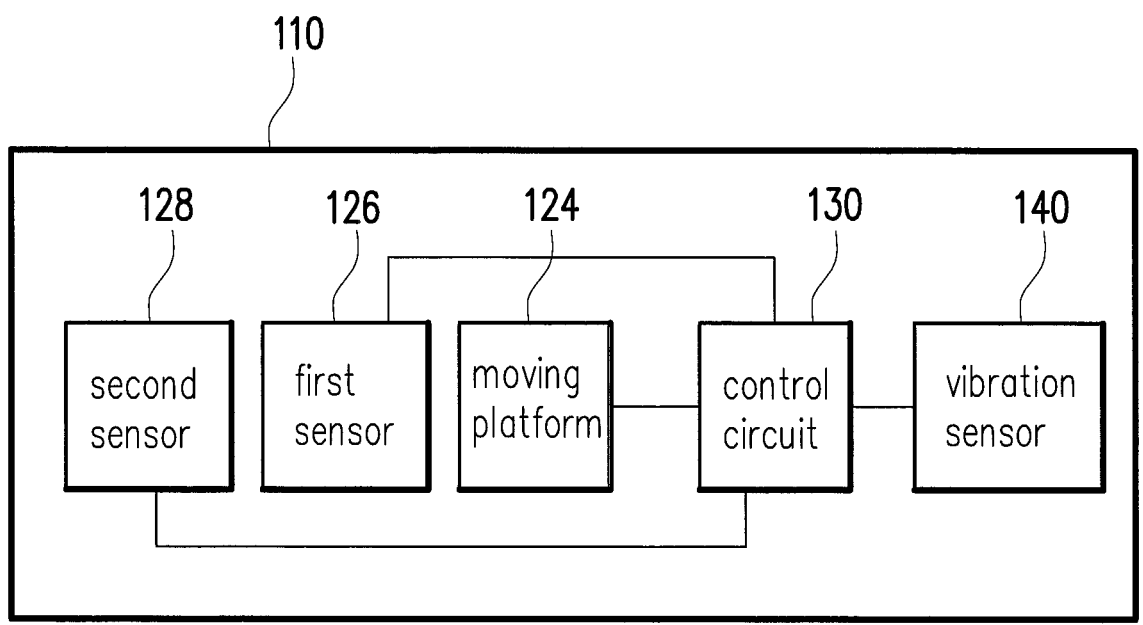
FIG. 4 is a schematic block diagram of the image capturing device according to FIG. 1.

FIG. 4 is a schematic block diagram of the image capturing device according to FIG. 1. Referring to FIG. 4, in detail, the image capturing device 100 further includes a control circuit 130 and a vibration sensor 140. The control circuit 130 is disposed on the main body 110 and is electronically connected to the moving platform 124. The vibration sensor 140 is disposed on the main body 110 and is electronically connected to the control circuit 130. The vibration sensor 140 is configured to sense the vibration value of the main body 110, wherein the vibration value includes the magnitude and the direction of the vibration. When the vibration sensor 140 senses the main body 110 vibrating, the vibration sensor 140 transmits a signal to the control circuit 130 such that the control circuit 130 drives the moving platform 124 moving relatively to the main body 110 for compensating the vibration value. The vibration sensor 140 can be, for example, accelerometer, gyroscope, etc., but the present invention is not limited thereto.

Furthermore, the first sensor 126 and the second sensor 128 are electronically connected to the control circuit 130. When the displacement value of the moving platform 124 along the first direction D1 (as shown in FIG. 3) and the displacement value of the moving platform 124 along the second direction (as shown in FIG. 3) are enough to compensate the vibration value, the first sensor 126 and the second sensor 128 transmit a signal to the control circuit 130 such that the control circuit 130 stops driving the moving platform 124 to move. If the vibration sensor 140 senses other vibration values from the main body 110 and continues transmitting signals to the control circuit 130, the control circuit 130 continues to drive the moving platform 124 to move along a suitable direction to compensate according to the signals.

Referring to FIG. 3, in the present embodiment, the number of the first sensors 126 is 2 and the first sensors 126 are arranged along a first axis A1 of the first direction D1. The number of the second sensors 128 is 2 and the second sensors 128 are arranged along a second axis A2 of the second direction D2. The two first sensors are separated by a distance and the two second sensors 128 are separated by a distance. Therefore, the sensing range of the first sensors 126 along the first direction D1 to the magnetic force of the magnetic element 122 can be increased, and the sensing range of the second sensors 128 along the second direction D2 to the magnetic force of the magnetic element 122 can also be increased in order to enhance the performance of the optical image stabilizer 120. The distance between the two first sensors 126 and the distance between the two second sensors 128 can be adjusted according to the design requirement for better sensing effect.

As shown in FIG. 3, the two first sensors 126 and the two second sensors 128 surround an intersection of the first axis A1 and the second axis A2 and are symmetrically arranged such that the two first sensors 126 and the two second sensors 128 can be disposed in a more concentrated way and the layout space can be further saved. In other embodiment, the first sensors 126 and the second sensors 128 can be arranged in other suitable way, which is not limited in the present invention.

In summary, the first sensor and the second sensor provided in the present invention are disposed on the same region of the moving platform for sensing the magnetic force generated by the same magnetic element. Therefore, the present invention only needs to be disposed one magnetic element for the first sensor and the second sensor to perform sensing process and to calculate the displacement value of the moving platform along the first direction and the second direction in order to save the manufacturing cost and the layout space. Furthermore, the number of the first sensors can be two, and the number of the second sensors can also be two for increasing the sensing range of the first sensor and the second sensor to the magnetic force of the magnetic element, such that the performance of the optical image stabilizer is enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical image stabilizer, adapted to be used in an image capturing device, comprising:
   a magnetic element, directly fixed on a main body of the image capturing device;
   a moving platform, movably disposed on the main body, wherein a region of the moving platform is aligned to the magnetic element;
   at least a first sensor, fixed on the region of the moving platform, wherein when the moving platform moves relatively to the main body, the first sensor senses a variation of a magnetic force applied to the first sensor by the magnetic element for calculating a displacement of the moving platform along a first direction; and
   at least a second sensor, fixed on the region of the moving platform, wherein when the moving platform moves relatively to the main body, the second sensor senses a variation of a magnetic force applied to the second sensor by the magnetic element for calculating a displacement of the moving platform along a second direction, wherein the first direction is perpendicular to the second direction, and the first sensor senses the variation of the magnetic force applied by the magnetic element at the same time as the second sensor.

2. The optical image stabilizer of claim 1, wherein the image capturing device comprises:
   a control circuit, disposed on the main body and electronically connected to the moving platform; and
   a vibration sensor, disposed on the main body and electronically connected to the control circuit, wherein the vibration sensor is configured to sense a vibration value of the main body, and the control circuit is configured to drive the moving platform to move relatively to the main body for compensating the vibration value.

3. The optical image stabilizer of claim 2, wherein the first sensor and the second sensor are electronically connected to the control circuit, and when the displacement of the moving platform along the first direction and the displacement of the moving platform along the second direction are enough to compensate the vibration value, the control circuit stops driving the moving platform.

4. The optical image stabilizer of claim 1, wherein the number of the at least one first sensors is two and the first sensors are arranged along a first axis, the first axis is parallel to the first direction, and the two first sensors are spaced by a distance.

5. The optical image stabilizer of claim 4, wherein the number of the at least one second sensors is two and the second sensors are arranged along a second axis, the second axis is parallel to the second direction, and the two second sensors are spaced by a distance.

6. The optical image stabilizer of claim 5, wherein the two first sensors and the two second sensors surround an intersection of the first axis and the second axis.

7. An image capturing device, comprising:
   a main body; and
   an optical image stabilizer, comprising:
      a magnetic element, directly fixed on the main body;
      a moving platform, movably disposed on the main body, wherein a region of the moving platform is aligned to the magnetic element;
      at least a first sensor, fixed on the region of the moving platform, wherein when the moving platform moves relatively to the main body, the first sensor senses a variation of a magnetic force applied to the first sensor by the magnetic element for calculating a displacement of the moving platform along a first direction; and
      at least a second sensor, fixed on the region of the moving platform, wherein when the moving platform moves relatively to the main body, the second sensor senses a variation of a magnetic force applied to the second sensor by the magnetic element for calculating a displacement of the moving platform along a second direction, wherein the first direction is perpendicular to the second direction, and the first sensor senses the variation of the magnetic force applied by the magnetic element at the same time as the second sensor.

8. The image capturing device as claimed in claim 7, further comprising:
   a control circuit, disposed on the main body and electronically connected to the moving platform; and
   a vibration sensor, disposed on the main body and electronically connected to the control circuit, wherein the vibration sensor is configured to sense a vibration value of the main body, and the control circuit is configured to drive the moving platform to move relatively to the main body for compensating the vibration value.

9. The image capturing device of claim 8, wherein the first sensor and the second sensor are electronically connected to the control circuit, and when the displacement of the moving platform along the first direction and the displacement of the moving platform along the second direction are enough to compensate the vibration value, the control circuit stops driving the moving platform.

10. The image capturing device of claim 7, wherein the number of the at least one first sensors is two and the first sensors are arranged along a first axis, the number of the at least one second sensors is two and the second sensors are arranged along a second axis, the first axis is parallel to the first direction, the second axis is parallel to the second direction, the two first sensors are spaced by a distance, and the two second sensors are spaced by a distance.

* * * * *